Figure 1:
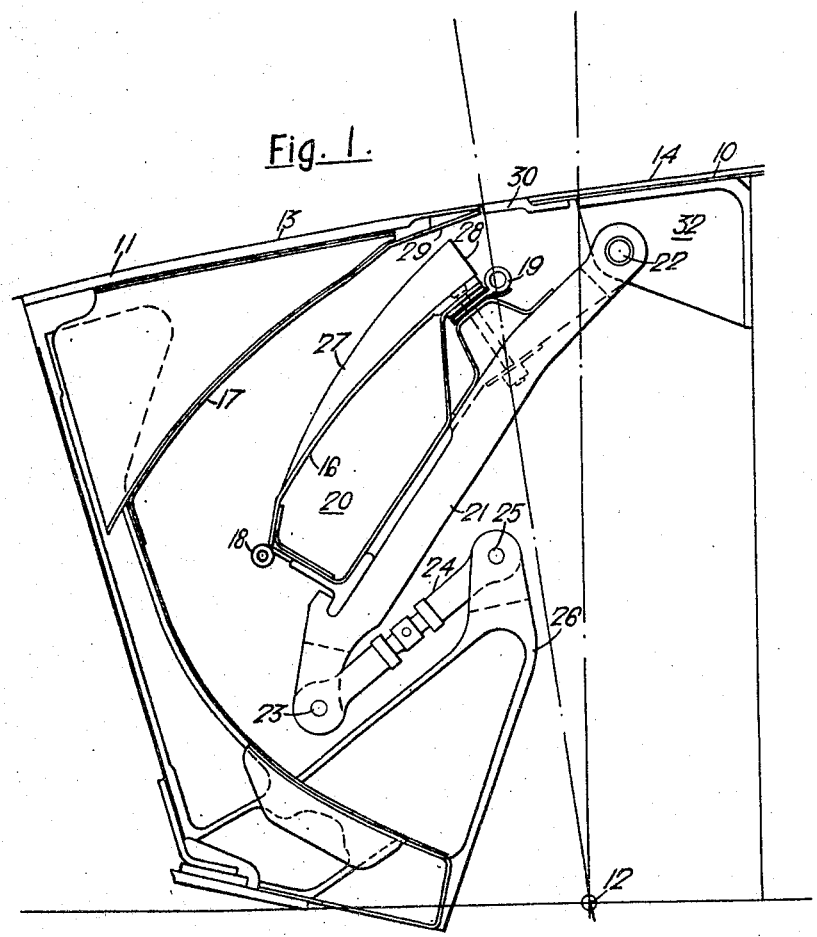

Aug. 2, 1966  J. C. WIMPENNY  3,263,945
AIRCRAFT

Filed Jan. 14, 1964  2 Sheets-Sheet 1

Inventor
John Cecil Wimpenny

By
Attorney

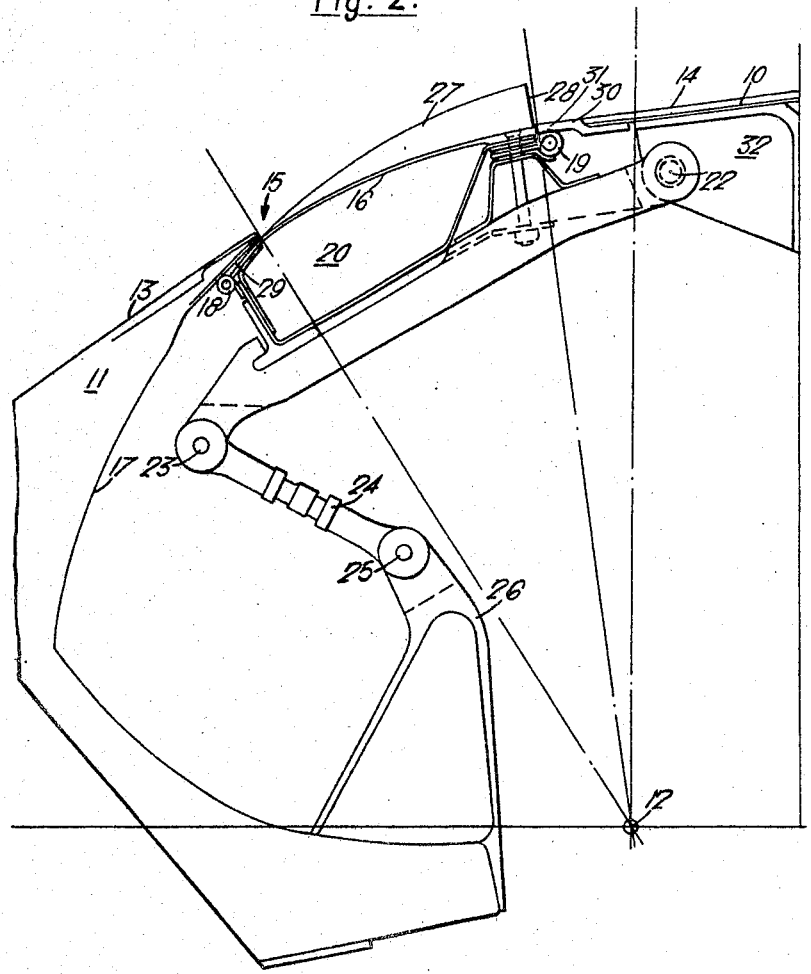

United States Patent Office 3,263,945
Patented August 2, 1966

3,263,945
AIRCRAFT
John Cecil Wimpenny, St. Albans, England, assignor to Hawker Siddeley Aviation Limited, London, England
Filed Jan. 14, 1964, Ser. No. 337,595
Claims priority, application Great Britain, Jan. 16, 1963, 2,067/63
7 Claims. (Cl. 244—42)

This invention relates to aircraft, and in particular aircraft wing or other lifting surfaces which comprise two adjacent parts that are relatively movable to a separated position to alter the overall configuration of the surface.

An example of such a construction is a droop nose aircraft wing, by which is meant a wing having a nose section pivotally mounted adjacent its lower trailing edge on a main wing section for movement from a normal flight position, in which the nose section and main section have a continuous common chord line, to a drooped position in which the nose section chord line extends forwardly and downwardly from that of the main section. In the drooped position there is a space between the upper trailing edge of the nose section and the upper leading edge of the main section.

With the nose section in the drooped position there is a comparatively abrupt change in the angle of the chord line between the nose and main sections, and there arises the problem of how best to overcome the tendency of the air flow to break away from the upper surface of the main section behind the discontinuity.

According to the present invention, an arrangement comprising an aircraft lifting sufrace in two adjacent sections relatively movable to a separated position in which the surface curvature, or rate-of-change of angle of the chord line, is great, is characterised in that there is movable into the gap between the sections when they are so separated a plurality of elements that constitute vortex generators.

The invention is directed to the use of vortex generators in this particular way and does not reside in vortex generators per se since the arrangement and operation of these, and their use in both ducted and ductless situations, is known. The nature and function of blade or vane elements constituting vortex generators is, for example, dealt with in some detail in British Patent specification No. 683,865.

In the special case of a droop nose wing, there may be one or more closure members or sealing plates that lie retracted within the wing during the normal flight condition and are raised to fill the gap between the upper surfaces of the nose and main sections of the wing when the nose section is drooped, vortex generating blades being disposed on the upper sides of these plates.

A primary advantage of this invention is that by making the vortex generators retractable for crusing flight their drag penalty is avoided for the greater part of the flight and in addition the generators are less prone to accidental damage when the aicraft is on the ground as they may then be kept retracted also. At the same time their full benefit in increasing the lift of the wing as required for take-off and landing is available when the droop is extended.

One construction of droop nose wing in accordance with the invention will now be described by way of example and with reference to the accompanying drawings, in which:
FIGURE 1 shows a portion of the wing, in cross-section, in the normal flight condition, and
FIGURE 2 shows the same portion in the nose drooped condition.

The wing shown in part in the drawings comprises a main section 10 and a nose section 11, the nose section being arranged to droop by turning forward and downward about a pivot 12 on the main section. FIGURE 1 illustrates the normal flight condition in which the upper surfaces 13, 14 of the nose and main sections have a continuous common chord line. FIGURE 2 shows the droop position, in which it will be seen that the chord line represented by the upper surface 13 of the nose section 11 has turned forward and downward, with an increase in overall curvature of the chord line over the nose portion of the wing and the creation of a gap or discontinuity 15 between the nose section surface 13 and the main section surface 14.

For filling the gap there is provided a number of sealing plates 16 that lie retracted within the wing, in a recess 17 of the nose section, during the normal flight condition and are raised to bridge the distance between the trailing edge of the upper surface of the nose section and the leading edge of the upper surface of the main section in the drooped position. The plates 16 have seals 18, 19 to engage cooperating sealing parts 29, 30 of the upper structures of the nose and wing sections and so seal the joints when the wing is in the drooped nose condition.

At least some of the sealing plates 16 have stiffening webs 20 and all are carried by arms 21 each pivotally connected to an internal bracket 32 near the top of the main section 10 of the wing, the pivot axis 22 lying within the wing just below the upper surface 14 and a little to the rear of the leading edge 31 of the main section. The free end of each arm 21 is pivotally connected at 23 to a link 24 that has its other end pivotally mounted at 25 on the upper end of an internal upstanding bracket 26 forming part of the structure of the nose section 11 of the wing. The arrangement is such that, when the nose section is moved to the droop position by hydraulic jacks (not shown), cooperation of the arms 21 and links 24 brings about the raising of the sealing plates 16 into position in the gap 15.

Each of the plates 16 carries on its upper side a series of vortex generating blades 27 upstanding therefrom. The blades are spaced from one another along the spanwise direction of the wing and extend generally in the chord-wise direction but at a sufficient angle to the local flow, say 15° to 20°, to generate a strong vortex. In the particular arrangement described and illustrated the blades are in pairs with the two blades of each pair oppositely inclined, but other arrangements are possible and the blades could all have the same direction of inclination if desired. It is unnecessary to describe here in detail the underlying theory and construction of such vortex generating blades because they are known from and described in, for example, the aforementioned patent specification. Briefly, their purpose is to promote a planned vortex mixing in the air stream flowing over the wing; breakaway of the air flow from the surface over which it passes is promoted by the fact that there is a considerable difference in flow rate as between the boundary flow immediately next to the surface and the main flow of air outside the boundary flow, and separation of the stream from the surface can therefore be inhibited by effecting a certain degree of mixing of the boundary flow so as to speed up the boundary air with energy abstracted from the main flow. The blades 27 are arranged to produce vortices in the air flow, like the vortices at the tips of aircraft wings, to achieve the desired mixing.

Vortex generating blade design is commonly akin to that of a wing. It will be seen that those in the illustrated example rise smoothly and gradually at their forward ends from the surface of the sealing plates 16 and terminate at their trailing ends in an abrupt edge or step 28 so as to set up vortices behind them while keeping the drag penalty low.

I claim:
1. An aircraft wing comprising a main section and a drooping nose section having a pivotal mounting on the main section, said main section and nose section having respective upper surfaces which possess a substantially continuous common chord line when said sections are in a first positional relationship, said nose section pivoting on said pivotal mounting relative to said main section to a second positional relationship in which said upper surfaces are separated by a gap, at least one sealing plate pivotally mounted on said main section and lying in a retracted position wholly inward of said upper surfaces when said main and nose sections are in said first positional relationship, means moving said sealing plate into said gap to close it when said main and nose sections are brought into said second positional relationship, and a series of blades upstanding on said sealing plate and constituting vortex generators, said blades lying retracted wholly inward of said upper surfaces of said main and nose sections when said sections are in said first positional relationship, and projecting out above said upper surfaces when said sections are in said second positional relationship and the sealing plate is in the gap.

2. A wing according to claim 1, wherein a recess is provided in the rear part of the nose section into which each sealing plate swings down about said pivotal mounting on the main section of the wing when the sealing plate and vortex generators are retracted and the aforesaid gap is closed.

3. A wing according to claim 2, wherein the sealing plate is carried on arms each of which extends forward and downward from a pivotal mounting within the main section of the wing just below the upper surface thereof and a short distance back from the leading edge of said upper surface.

4. A wing according to claim 3, further comprising a plurality of sealing-plate-operating links each pivotally connected at one end to the forward end of one of said arms and pivotally connected at the other end to said nose section at a point to the rear of said forward end of said arm, said arm and link lying in a folded configuration with the rear end of said link above the forward end thereof when the sealing plate is retracted and the main and nose sections are in said first positional relationship, and said rear end of said link lying below the forward end thereof when the main and nose sections are in said second positional relationship and the sealing plate lies in said gap therebetween.

5. A wing according to claim 1, wherein each sealing plate has sealing members at its leading and trailing edges to seal against cooperating surfaces at the trailing and leading edges of the upper surfaces of the nose and main sections, respectively.

6. A wing according to claim 1, wherein the vortex generator blades are dimensioned to lie within the boundary flow associated with said upper surfaces, and each is inclined to the local air flow and has an abrupt discontinuity at its trailing edge.

7. An aircraft lifting member comprising a main section and a subsidiary section movably mounted on the main section and movable from a first positional relationship with said main section in which an outer surface of said main section and an outer surface of said subsidiary section possess a substantially continuous common chord line to a second positional relationship in which said outer surfaces of said main and subsidiary sections are separated by a gap, at least one sealing plate movably mounted on one of said sections and movable into said gap to close it substantially when said sections are in said second positional relationship, said sealing plate carrying thereon a plurality of vortex generating vanes which stand out beyond said sealing plate and said outer surfaces of said sections when the sealing plate is in position in said gap, and means retracting said sealing plate and said vortex generating vanes thereon wholly within said outer surfaces of said sections when said sections are moved to said first positional relationship.

References Cited by the Examiner
UNITED STATES PATENTS

| | | | |
|---|---|---|---|
| 1,759,032 | 5/1930 | Bauer | 244—40 X |
| 2,885,161 | 2/1959 | Kerker et al. | 244—91 X |
| 2,938,680 | 5/1960 | Greene et al. | 244—42 |
| 3,191,887 | 6/1965 | Ikai et al. | 244—42 |
| 3,195,836 | 7/1965 | Calderon | 244—42 |

FOREIGN PATENTS 595,877   4/1960   Canada.

MILTON BUCHLER, *Primary Examiner.*

B. BELKIN, *Assistant Examiner.*